Aug. 10, 1948.    F. D. BURNS    2,446,740
APPARATUS FOR CALIBRATING FLUID PRESSURE GAUGES
Filed Sept. 24, 1943

FRANK DONALD BURNS.
INVENTOR.

BY *Altsch & Knoblock*
*Attorneys.*

Patented Aug. 10, 1948

2,446,740

UNITED STATES PATENT OFFICE 2,446,740

APPARATUS FOR CALIBRATING FLUID PRESSURE GAUGES

Frank Donald Burns, Long Beach, Ind., assignor to The Hays Corporation, Michigan City, Ind., a corporation of Indiana Application September 24, 1943, Serial No. 503,606

21 Claims. (Cl. 73—4)

1

This invention relates to a testing device. More particularly, the invention relates to a device for generating and applying an accurately measured pressure to a pressure sensitive device.

Devices of this character may be used for various purposes. One purpose or use of the device is for the calibration of pressure measuring instruments, such as draft gages and low pressure gages. Calibration of such instruments requires the use of an accurate standard in the nature of means for applying to the instrument under test a pressure of known value against which the reading or calibration of the instrument under test may be checked. The control of the pressure applied within an acceptably small range of variation, the simplicity of operation of the control means, and the ability to quickly and accurately vary the pressure applied are important factors in any device of this character. Therefore, it is one of the primary objects of the invention to provide a device of this character by which the calibration of a pressure responsive instrument can be determined or tested readily and accurately.

A further object is to provide a device for creating an accurately measured pressure and for applying the same to a pressure sensitive device.

A further object is to provide a device of this character which will respond quickly to changes in adjustment and which will operate after adjustment substantially free from pressure pulsations.

A further object is to provide a device of this character utilizing a pressure measuring device to control the operation of a reversible pump for creating and applying pressure to said measuring device and to other pressure sensitive means.

A further object is to provide a device of this character wherein a pressure measuring device has a pressure connection with branches leading respectively to pressure generating means and pressure sensitive means, and mounts a control switch for controlling a reversible electric power member driving said generating means.

A further object is to provide a device of this character wherein a pressure measuring means mounts a switch including a micrometrically adjustable element and an element positioned by operation of said means, whereby said switch closes when said means responds to a pressure of the value for which said adjustable member has been set and opens when the applied pressure deviates in one direction from said setting.

A further object is to provide a U-tube with a switch having a contact adjustable vertically in one leg thereof and means operating in opposite directions for increasing and decreasing pressure applied at the other leg of said U-tube according to whether said switch is open or closed and thereby alternately opening and closing said switch.

A further object is to provide a device of this character with a control switch having adjustable and pressure responsive contacts and means controlled by the switch for alternately increasing and decreasing pressure applied to the device, wherein said last named means normally operates at low speed but will operate at comparatively high speed incident to shifting of said adjustable contact.

A further object is to provide a device of this character having a reversible pressure generating means, a pressure measuring device, a control switch having manually adjustable and pressure adjustable contacts which are arranged to be alternately opened and closed by pressure variations created by said generating means and which control said generating means, means normally operative to condition said generating means for low speed operation, and means responsive to movement of said adjustable contact for rendering said low speed conditioning means inoperative and thereby permitting comparatively high speed operation of said generating means.

Other objects will be apparent from the description, drawings and appended claims.

Figure 1:
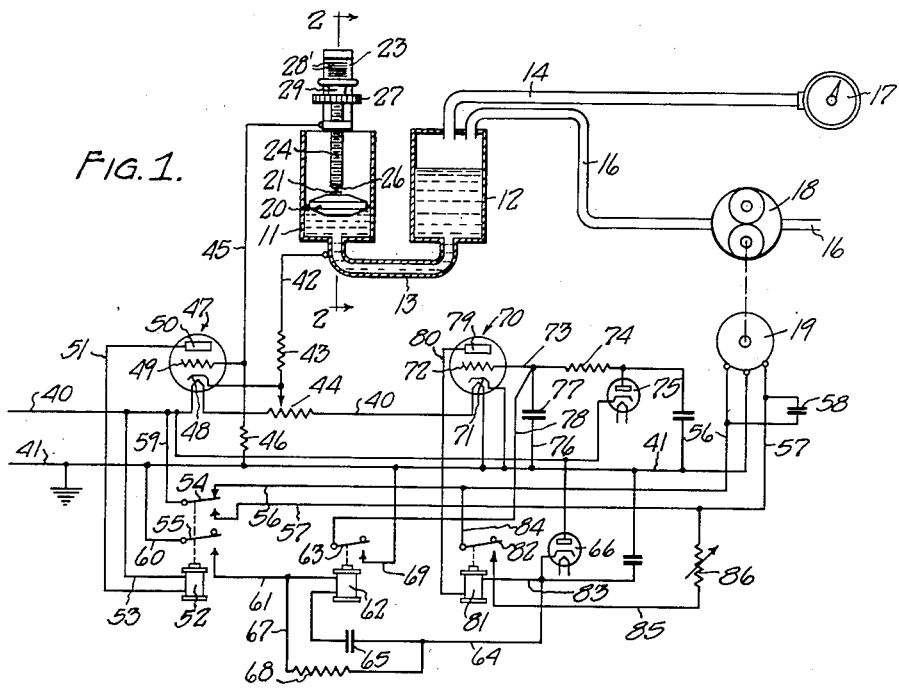
Fig. 1 is a diagrammatic view of the device.
Figure 2:
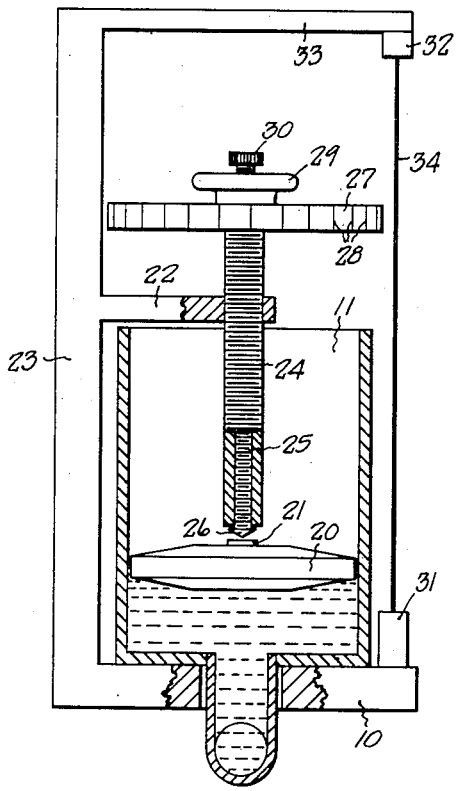
Fig. 2 is an enlarged vertical sectional view of the device taken on line 2—2 of Fig. 1.

Referring to the drawing, which illustrates one embodiment of the invention, the numeral 10 designates a base or support for a gas measuring device of the U-tube type. As here illustrated, the gas measuring device comprises a liquid containing chamber 11 open at its upper end, a closed liquid containing chamber 12, and a conduit 13 connecting the bottoms of said chambers. Chambers 11 and 12 are preferably of large diameter compared to the diameter of conduit 13, and the inner surfaces of said chambers are finished, as by honing, to be of identical diameter, with the tolerance from exact diameter of each less than .001 of an inch. The U-tube contains a quantity of liquid, such as water, mercury, or other standard liquid suitable for use in measuring pressures. A conduit 14 is connected with the upper end of closed chamber 12 to communicate therewith. Conduit 14 is adapted for connection with a pressure sensitive device 17 to which the pressure generated and measured by the device is to be supplied. A conduit 16, open to atmosphere, and connected with closed chamber 12, has a reversible air pump 18 interposed therein and driven by a reversible electric motor 19, such as a three lead condenser type motor. Air pump 18 may be of any suitable type, and preferably is of the type illustrated in my co-pending application, Serial No. 460,392, filed October 1, 1942, now Patent No. 2,416,980.

Micrometer measuring and control means are associated with the gas measuring device. Said means comprises an electric switch having contacts controlled respectively by manually adjustable means and by means responsive to the liquid level in one leg of the gage. A float 20 has a guided friction-free fit within chamber 11 and fixedly mounts a contact 21 at the center of its upper side, whereby said contact has a vertical guided movement axially of chamber 11 which is freely and accurately responsive to any variation in the level of the liquid in chamber 11, regardless of how small the variation may be. A horizontal member 22, here illustrated as extending transversely above chamber 11 from a standard 23 carried by base 10, has a micrometer screw 24 threaded therein in coaxial relation to chamber 11 and adapted to extend downwardly into said chamber. Screw 24 has a central longitudinal screw threaded bore in which a screw 25 of greater length than screw 24 is threaded. Inner screw 25 projects from the lower end of screw 24 and mounts a contact 26 with which contact 21 is adapted to engage. Outer screw 24 fixedly mounts an enlarged dial 27 adjacent its upper end, and the periphery of said dial has a plurality of equispaced micrometric indicia or marks 28 thereon parallel to the axis thereof. The upper end of outer screw 24 fixedly mounts an operating knob 29. Inner screw 25 projects above knob 29 and mounts a knob or hand piece 30. The standard 23 may project above member 22 and be provided with spaced horizontal indicia or markings 28' on the face thereof adjacent dial 27 and adapted to be read therewith in the manner in which a conventional micrometer is read. A wire gripping or securing member 31 is preferably mounted on the base 10 directly in front of chamber 11. A second or upper wire gripping or securing member 32 is positioned in vertical alignment with member 31. Upper member 32 is suitably fixedly supported, as by a horizontal arm 33 projecting forwardly from the upper end of standard 23. A thin wire 34 is held in taut vertical position by members 31 and 32, and preferably is close to dial 27 so that the dial markings 28 may be read accurately with respect thereto, as in reading a conventional micrometer.

It will be apparent that when the markings 28 and 28' are properly correlated with the normal liquid level, i. e., level at zero pressure differential in the two chambers, with the position of contact 21 relative to liquid level, with the length of the micrometer screw and with the spacing or dial 27 and contact 26, the device may be used to adjust the position of the contact with micrometric accuracy. Thus it is possible to set contact 26 so that it will be engaged by contact 21 when the liquid level reaches a predetermined point. The accuracy of the device permits it to be set for a pressure of .001 of an inch of the liquid, as water or mercury, in the gage. The use of a double micrometer screw, with the outer screw carrying the micrometer dial and the inner screw mounting the contact, provides convenient zero-adjustment means. In other words, when the liquid level in chamber 11 is at zero pressure, dial 27 may be set at zero relative to wire 34, and screw 25 may be manipulated until it is positioned at the precise point at which contact 26 engages contact 21.

The contacts 21 and 26 form a switch for controlling the reversible pump operating motor 19. The arrangement between said switch and motor is such that when said contacts engage the motor is operated in a direction to operate the air pump to change the pressure applied at the U-tube in a manner to cause float 20 and contact 21 to be lowered and thus disengage said contacts, and when said contacts are out of engagement the motor operates the pump to apply a pressure factor at the U-tube which will cause said float and contact to move in contact-engaging direction. The circuit between the contacts and the pump motor is as follows: Lines 40 and 41 are connected with a suitable source of power. A lead 42 is connected to line 40 and to the U-tube or gage at a point, as at conduit 13, whereby the liquid and float cooperate to transmit current therefrom to contact 21. Lead 42 has a resistor 43 interposed therein and its connection with said line is effected at a variable resistor 44. A lead 45 branches from line 41 and connects with the contact 26 through the micrometer screws and associated parts, said lead having a resistor 46 therein. An electron tube 47 has its cathode 48 connected to line 40 and its grid 49 connected with lead 45. Plate 50 of said tube is connected by lead 51 with the coil of a relay 52, said relay coil being connected by lead 53 with line 40. Relay 52 has two switch arms 54 and 55. Switch arm 54 is selectively positioned in engagement with the terminals of leads 56 and 57 connected with motor 19 and having a condenser 58 connected thereacross. Line 41 is connected to the center tap of motor 19, and switch arm 54 is connected by lead 59 to a line 40. Relay 52 is of the type whereby the switch arms thereof are normally urged thereby into engagement with one of the terminals associated therewith when the coil thereof is deenergized, and said arms are urged into engagement with the opposite terminals when the coil thereof is energized. Hence it will be apparent that when contacts 21 and 26 are in engagement the motor 19 will be caused to operate in one direction, and when said contacts are disengaged said motor will be caused to operate in the opposite direction.

It is desirable, by reason of the fact that the pressure generated should be substantially constant in conduits 14 and 16 at a point as set by the micrometer adjustment and should be substantially free from pulsations, to provide means for operating the motor 19 at slow speed at such times as it is controlled in an alternating reversing movement by normal making and breaking of the control circuit at contacts 21 and 26. Also, it is desirable that time delay means be associated with the motor speed controller to permit comparatively high motor speed following each adjustment of the position of contact 26 by the micrometer, so that the device will have a satisfactorily rapid response to adjustment thereof. Various means may be employed to achieve these functions, and an electronic method has been selected for illustration.

Switch arm 55 of relay 52 is connected by lead 60 with line 41 and has two terminals associated therewith, one of which may be grounded and the other of which has a lead 61 connected therewith and extending for connection with the coil of a second relay 62 having a switch arm 63. A lead 64 connects said relay coil with line 41, and has a condenser 65 and a battery or rectifier tube 66 interposed therein. A lead 67 branches from lead 64 and is connected with lead 61, and has a resistor 68 interposed therein. Two terminals are associated with switch arm 63, one being grounded, and the other being connected with lead 69 which connects to line 41.

A second electron tube 70 has its cathode 71 connected across lines 40 and 41, and its grid 72 is connected by lead 73 to line 41 through resistor 74 and battery or rectifier tube 75. A lead 76 branches from line 41 and is connected with lead 73 between resistor 74 and the tube grid. A condenser 77 is interposed in lead 76. A lead 78 is also connected with lead 73 between the tube grid and resistor 74 and extends for connection with the switch arm 63 of relay 62.

The plate 79 of tube 70 is connected by lead 80 with the coil of a third relay 81 having a switch arm 82 associated with two terminals, one of which is grounded. A lead 83 connects the coil of relay 81 with lead 64, between condenser 65 and line 41. A lead 84 connects switch arm 82 with lead 56. A lead 85 connects the normally open terminal of the switch of the third relay 81 with lead 57, and has a rheostat 86 interposed therein.

For purposes of illustration, the approximate or preferred values of the various resistors and condensers are given as follows: resistor 43—500,000 ohms; resistor 44—200 to 500 ohms; resistor 48—1,000,000 ohms; resistor 68—5,000 ohms; resistor 74—2,000,000 ohms; condenser 53—1 microfarad; condenser 65—8 microfarads; and condenser 77—.25 microfarad. It will be understood that these values are not critical, and they may be changed materially without affecting over-all operation substantially, as will be apparent to those skilled in the art.

The operation of the device is as follows: Assuming that the contact 26 has been adjusted for the desired pressure, the device operates to continuously open and close contacts 21 and 26 as the liquid level is alternately lowered and raised by successive reversals of operation of pump 18 by reversible motor 19 controlled by said contacts. More particularly, assuming that the circuit is in the condition shown, with contacts 21 and 26 open, and that pump 18 is being operated by motor 19 in response to a given setting of switch arm 54 to apply a pressure value which will raise the level of liquid in chamber 11 to bring contact 21 into engagement with contact 26, a circuit will be closed by said contacts to operate relay 52 and bring switch arm 54 into engagement with the opposite associated terminal to reverse the direction of rotation of motor 19 and the pump 18. This operation momentarily energizes the second relay 62 by means of the charging current of condenser 65 to discharge the time delay condenser 77, thereby bringing the grid 72 of tube 70 to the same potential as cathode 71 of said tube. The resulting plate current in tube 70 operates the third relay 81, thereby connecting rheostat 86 across the motor capacitor 58 to slow down the speed of operation of motor 19 below normal speed thereof.

It will be noted that the second relay 62 can operate only momentarily, inasmuch as it is in a direct current circuit with tube or battery 66, and resistance 68 is across the line in which condenser 65 is connected in series with the relay coil. Consequently, relay 62 will be energized following closing of contacts 21—26, only while condenser 65 is charging.

As soon as the above described reversal of operation of motor and pump results in lowering of the liquid level in chamber 11 the small amount necessary to break the control circuit at contacts 21 and 26, the relay 52 is deenergized for return to inoperative position, thus again reversing the direction of operation of the motor and pump by the action of switch arm 54. Assuming that this operation breaks the direct current circuit energized at 66, the condenser 65 therein is discharged, with resultant momentary energization of relay 62 which again serves to energize tube 70 and relay 81 to again insert shunt resistance of rheostat 86 across the motor capacitor 58 to obtain slow speed operation of motor 19 and pump 18.

From the above, it will be apparent that the electrical system of the device is composed of three parts which may be termed the contacting relay circuit, the time delay or motor speed controlling circuit, and the resetting circuit controlled by the contacting relay circuit and controlling the time delay circuit. The contacting relay circuit consists essentially of the contacts 21 and 26, tube 47, relay 52, switch 54 and leads 56—57. The time delay circuit consists essentially of the tube 70, relay 81, switch 82, rheostat 86, condenser 77, resistor 74 and battery or rectifier tube 75. The resetting circuit consists of the switch 55, relay 62, switch 63, resistor 68, condenser 65, and battery or rectifier tube 66.

In the event reversals fail to take place at the normal time periods or intervals, as would result from adjustment of the position of the contact 26 by the micrometer, a different operation occurs. Thus assume that the operator adjusts the position of contact 26 upwardly. The contacting relay circuit, the resetting circuit and the time delay circuit will all be operated in the sequence above described, to interpose the shunt resistance 86 across motor capacitor 58, and the motor 19 will begin its slow speed operation of pump 18 to apply a pressure factor to the gage which will cause contact 21 to be moved upwardly. However, in view of the momentary actuation of the relay as limited by the discharging of condenser 65, the time during which the potential of grid 72 of tube 70 is high as required for operation of relay 81 is limited. After that time the condenser 77 charges negatively through resistor 74 to make grid 72 negative beyond the cut-off point of the tube, thus deenergizing relay 81 to remove the shunting resistor 86 from operative connection with motor 19. This allows the motor 19 to operate at full speed to operate pump 18 to cause a quick change in the liquid level in the gauge to again bring contact 21 into engagement with contact 26. Hence, the device has a rapid response to changes in the micrometer setting, and returns immediately after such response to its normal comparatively low speed pulsation-preventing reversing operation.

It will be apparent that the device is primarily intended for work with low pressures, including sub-atmospheric pressures; and the drawing illustrates its use with sub-atmospheric pressure as evidenced by the relative liquid levels illustrated in the two chambers of the gage. Also, it will be apparent that the invention is susceptible of embodiment in variant forms, all falling within the spirit of the invention.

I claim:

1. In a testing device, a pressure gage, a reversible air pump connected with said gage and adapted for connection with a pressure sensitive device to be tested, a reversible motor operating said pump, a switch associated with said gage and including manually adjustable and pressure responsive contacts, and means controlled by said switch for controlling said motor and pump to generate and apply a pressure factor corresponding to the setting of said manually adjustable contact.

2. In a testing device, a pressure gage, a reversible air pump connected with said gage and adapted for connection with a pressure sensitive device to be tested, a reversible motor operating said pump, a switch associated with said gage and including manually adjustable and pressure responsive contacts, and means controlled by said switch for controlling said motor and pump to apply a pressure factor at said gauge of a character to change said switch setting, thereby alternately engaging and disengaging said contacts.

3. In a testing device, a pressure gage, a reversible air pump connected with said gage and adapted for connection with a pressure sensitive device to be tested, a reversible motor operating said pump, a switch associated with said gage and including manually adjustable and pressure responsive contacts, means controlled by said switch for controlling said motor and pump to generate and apply a pressure factor corresponding to the setting of said manually adjustable contact, and means for normally controlling said motor for low speed operation.

4. In a testing device, a pressure gage, a reversible air pump connected with said gage and adapted for connection with a pressure sensitive device to be tested, a reversible motor operating said pump, a switch associated with said gage and including manually adjustable and pressure responsive contacts, a contacting relay circuit controlled by said switch for controlling said motor and pump to apply a pressure factor at said gauge to reverse the position of said switch and thereby alternately apply opposite pressure factors to said gage, and means controlled by said contacting relay circuit for applying a speed reducing influence on said motor for a limited time after each operation of said contacting relay circuit.

5. In a testing device, a pressure gage, a reversible air pump connected with said gage and adapted for connection with a pressure sensitive device to be tested, a reversible motor operating said pump, a switch associated with said gage and including manually adjustable and pressure responsive contacts, means controlled by said switch for controlling said motor and pump to change the pressure at said gauge and reverse said switch whereby opposite pressure factors are alternately applied to said gage, means for reducing the speed of said motor, and means controlled by said motor control means for rendering said speed reducing means operative for a predetermined limited time only after each operation of said motor control means.

6. In a pressure generating and measuring device, a pressure gage, a reversible variable speed pressure generator connected with said gage, said gage and generator constituting parts of a fluid system which includes a third connected part, pressure responsive means associated with said gage and including a manually adjustable part for controlling said generator to normally alternate the direction of operation thereof at short time intervals to produce an average pressure corresponding to the setting of said manually adjustable part, low speed means normally controlling said generator, and means responsive to movement of said manually adjustable part for rendering said low speed means inoperative.

7. In a pressure generating and measuring device, a pressure gage, a reversible pressure generator connected to operate said gage and adapted to be connected with a pressure sensitive device, and pressure responsive means associated with said gage and including a manually adjustable part, said pressure responsive means controlling said generator to normally alternate the direction of operation thereof at short intervals of time to produce an average operating pressure for the pressure sensitive device corresponding to the setting of said manually adjustable part.

8. In a pressure generating and measuring device, a pressure gage, a reversible pressure generator connected to operate said gage and adapted to be connected with a pressure sensitive device, pressure responsive means associated with said gage and including a manually adjustable part, said means controlling said generator for normal reversal thereof at short intervals of time to generate an average operating pressure for the pressure sensitive device determined by the setting of said adjustable part, and generator regulating means for normally preventing pulsating operation of said generator.

9. In combination, a reversible fluid pump, a fluid receiver, a U-tube containing a liquid, means connecting said pump with said receiver and with one leg of said tube, a switch co-operating with said tube and including a pressure responsive element and a selectively positionable element, a micrometer mounting said last named switch element, and means controlled by said switch for controlling said pump to maintain a pressure in said gauge predetermined by the setting of said micrometer.

10. In a device for testing a pressure sensitive instrumentality, a reversible fluid pump, a U-tube containing a liquid, means connecting said pump and tube for control of the level of said liquid by said pump, means for connecting said instrumentality with said pump and tube, a switch controlled by the level of said liquid, said switch including an adjustable contact, a micrometer mounting said contact, and means controlled by said switch for reversing said pump to alternately raise and lower the level of said liquid adjacent said contact and thus alternately open and close said switch.

11. In combination, a reversible fluid pump, a fluid receiver connected with said pump, a liquid-containing pressure gage comprising a pair of chambers of identical inner diameters interconnected at their lower ends, one of said chambers being closed, means connecting said closed chamber with said pump, a micrometer associated with the other chamber and including a part shiftable longitudinally of said chamber and a contact within said chamber, and means responsive to the relative positions of said contact and liquid level for controlling said pump to generate a fluid pressure corresponding to the adjustment of said micrometer.

12. In combination, a pressure measuring liquid-containing chamber, pressure generating means connected with said chamber, and means for controlling said generating means to maintain an accurately determined pressure in said chamber and including a support fixed relative to said chamber, a micrometer screw extending into said chamber and threaded in said support and including a contactor on the inner end thereof, a disc fixed on the outer end of said shaft and having equi-spaced peripheral markings, and a wire mounted on said support parallel to said shaft and adjacent said disc, and a receiver connected with said pressure generating means.

13. In combination, a U-tube having a pair of legs and containing a quantity of liquid whose levels in said legs varies in accordance with pressure differences in said legs, pressure generating means connected with one leg of said tube, and means for controlling said generating means to maintain a predetermined pressure difference in said legs including a mounting member fixed relative to said U-tube, a member threaded in said support and extending into one of said legs, and micrometer means for measuring the position of said threaded member relative to said U-tube and including cooperating members carried by said mounting member and said threaded member, and a receiver connected with said pressure generating means.

14. In combination, a U-tube having a pair of legs and containing a quantity of liquid whose levels in said legs vary in accordance with pressure differences in said legs, a pressure generator connected with one leg of said tube, reversible drive means for said generator, and means controlling said drive means to maintain a constant pressure difference in said legs including a mounting member fixed relative to said U-tube, a member threaded in said mounting and extending into one of said legs, and micrometer means for measuring the position of said threaded member relative to said U-tube and including cooperating members carried by said mounting member and said threaded member and zero-adjusting means and a receiver connected with said generator.

15. In combination, a liquid containing U-tube having a pair of legs, a fluid receiver, means connecting one leg and said receiver with a source of pressure, and means for regulating the pressure applied to said tube including a support fixed relative to said U-tube, a screw adjustably mounted in said support and extending into one of said legs, said screw having a longitudinal bore, cooperating micrometric measuring means carried by said screw and said support, and a member adjustable in said bore and mounting a contactor on its inner end.

16. In combination, a fluid system including a receiver and a pressure measuring liquid containing member, pressure supplying means, and means controlling said supply means and including a float having free guided movement in said member, a contact carried by said float, a second contact in said member, and a micrometer carried by said member and mounting said second contact.

17. In combination, a fluid system including a receiver and a pressure measuring liquid containing member, pressure supplying means, and means controlling said supply means and including a float therein, a contact on said float, a second contact engageable with said first contact, a micrometer carried by said member and including a threaded shaft extending into said member, and zero adjusting means adjustable on shaft and carrying said second contact.

18. In combination, a fluid receiver, a pressure gage, a reversible fluid pump connected with said pressure gage and said receiver, a reversible capacitor motor for actuating said pump, an electric switch associated with said gage and including a manually adjustable contact, a relay controlled by said switch for controlling the direction of rotation of said motor to alternately open and close said switch, a resistor, and means responsive to said relay to connect said resistor across the capacitor of said motor for a limited time after each operation of said relay.

19. In combination, a fluid receiver, a pressure gage, a reversible fluid pump connected with said pressure gage and said receiver, a reversible capacitor motor for actuating said pump, an electric switch associated with said gage and including a manually adjustable contact, a relay controlled by said switch for controlling the direction of rotation of said motor to alternately open and close said switch, a resistor, and a direct current circuit including a condenser and a relay and responsive to said first relay for momentary operation to interpose said resistor in shunting relation across the capacitor of said motor.

20. In a testing device, a unit including a receiver and a liquid containing chamber and pressure generating means for varying the level of said liquid in said chamber, a switch unit including a contact adjustably mounted in said chamber, said switch unit being controlled by the liquid level in said chamber, one unit being adapted to follow variations in the other unit, a reversible electric motor controlled by said switch for driving said follow-up unit, and means for temporarily reducing the speed of said motor upon each reversal thereof.

21. In combination, a fluid system including a receiver and a pressure measuring liquid containing member, pressure supplying means, and means controlling said supply means and including a float having free guided movement in said member, a contact carried by said float, and a second contact carried by said member and engageable by said first contact.

FRANK DONALD BURNS.

REFERENCES CITED

The following references are of record in the file of this patent:

UNITED STATES PATENTS

| Number | Name | Date |
|---|---|---|
| 930,989 | Richards | Aug. 10, 1909 |
| 980,214 | Bishop | Jan. 3, 1911 |
| 1,134,316 | Collette | Apr. 6, 1915 |
| 1,172,661 | Ambruster | Feb. 22, 1916 |
| 1,190,044 | Thornson | July 4, 1916 |
| 1,208,226 | Storer | Dec. 12, 1916 |
| 1,309,505 | Beach | July 8, 1919 |
| 1,511,489 | Armstrong | Oct. 14, 1924 |
| 1,649,568 | Busch | Nov. 15, 1927 |
| 1,737,335 | Ruckstuhl | Nov. 26, 1929 |
| 1,938,492 | Moller | Dec. 5, 1933 |
| 1,972,812 | Woolley | Sept. 4, 1934 |
| 1,981,530 | Thomas | Nov. 20, 1934 |
| 2,057,101 | Kagi | Oct. 13, 1936 |
| 2,129,763 | Hart | Sept. 13, 1938 |
| 2,138,527 | Newman | Nov. 29, 1938 |
| 2,278,832 | Cornelius | Apr. 7, 1942 |